US012729098B2

(12) United States Patent
Huang et al.

(10) Patent No.: US 12,729,098 B2
(45) Date of Patent: Sep. 8, 2026

(54) ASSEMBLED PASSENGER CONVEYING SYSTEM, METHOD OF ASSEMBLING THE SAME, AND MODULARIZED DEVICE

(71) Applicant: Otis Elevator Company, Farmington, CT (US)

(72) Inventors: Jiangxing Huang, Hangzhou (CN); Minglei Feng, Hangzhou (CN); Zhengguang Zhou, Hangzhou (CN)

(73) Assignee: OTIS ELEVATOR COMPANY, Farmington, CT (US)

( * ) Notice: Subject to any disclaimer, the term of this patent is extended or adjusted under 35 U.S.C. 154(b) by 208 days.

(21) Appl. No.: 18/510,147

(22) Filed: Nov. 15, 2023

(65) Prior Publication Data

US 2024/0279028 A1 Aug. 22, 2024

(30) Foreign Application Priority Data

Feb. 17, 2023 (CN) ......................... 202310134803.5

(51) Int. Cl.

| | |
|---|---|
| ***B66B 23/12*** | (2006.01) |
| ***B66B 21/04*** | (2006.01) |
| ***B66B 21/10*** | (2006.01) |
| ***B66B 23/02*** | (2006.01) |
| ***B66B 23/14*** | (2006.01) |

(52) U.S. Cl.

CPC .............. *B66B 23/12* (2013.01); *B66B 21/04* (2013.01); *B66B 21/10* (2013.01); *B66B 23/02* (2013.01); *B66B 23/145* (2013.01)

(58) Field of Classification Search

CPC ......... B66B 23/12; B66B 21/04; B66B 21/10; B66B 23/02; B66B 23/145; B66B 23/08; B66B 21/02; B66B 23/024; B66B 25/00

See application file for complete search history.

(56) References Cited

U.S. PATENT DOCUMENTS

| | | | | |
|---|---|---|---|---|
| 3,731,166 A * | 5/1973 | Inuzuka | B66B 23/026 | 318/135 |
| 5,806,653 A * | 9/1998 | Ahls | F16G 13/00 | 198/500 |
| 7,219,784 B2 * | 5/2007 | Fargo | B66B 23/028 | 198/833 |

(Continued)

FOREIGN PATENT DOCUMENTS

| | | | |
|---|---|---|---|
| CN | 105398926 A * | 3/2016 | B66B 23/12 |
| EP | 1258447 A1 * | 11/2002 | B66B 21/02 |

(Continued)

OTHER PUBLICATIONS

European Search Report for Application No. 24156428.5, Issued Jun. 20, 2024, 9 Pages.

*Primary Examiner* — Gene O Crawford
*Assistant Examiner* — Abby A Jorgensen
(74) *Attorney, Agent, or Firm* — CANTOR COLBURN LLP

(57) ABSTRACT

An assembled passenger conveying system, a method of assembling the same and a modularized device. The assembled passenger conveying system includes at least two modularized devices, the at least two modularized devices are detachably connected to form a loading area, and power is supplied from one or more modularized devices to drive the loading area to travel on a conveying path of the assembled passenger conveying system.

18 Claims, 8 Drawing Sheets

(56) References Cited

U.S. PATENT DOCUMENTS

| | | | | |
|---|---|---|---|---|
| 7,308,978 | B2 * | 12/2007 | Matheisl | B66B 23/02<br>198/321 |
| 8,701,861 | B2 * | 4/2014 | Turek | B66B 23/08<br>198/326 |
| 2014/0057768 | A1 * | 2/2014 | Srb-Gaffron | B66B 23/145<br>492/15 |
| 2018/0118520 | A1 * | 5/2018 | Huang | B66B 23/02 |

FOREIGN PATENT DOCUMENTS

| | | | | | |
|---|---|---|---|---|---|
| EP | 1502891 | A1 | | 2/2005 | |
| EP | 3511282 | A1 | * | 7/2019 | B66B 23/10 |
| EP | 3511283 | A1 | * | 7/2019 | B66B 23/024 |
| EP | 3747821 | A1 | * | 12/2020 | B66B 23/026 |
| JP | 2001163562 | A | * | 6/2001 | B66B 23/028 |
| WO | WO-2013152714 | A1 | * | 10/2013 | B66B 23/024 |

* cited by examiner

ASSEMBLED PASSENGER CONVEYING SYSTEM, METHOD OF ASSEMBLING THE SAME, AND MODULARIZED DEVICE

FOREIGN PRIORITY

This application claims priority to Chinese Patent Application No. 202310134803.5, filed Feb. 17, 2023, and all the benefits accruing therefrom under 35 U.S.C. § 119, the contents of which in its entirety are herein incorporated by reference.

TECHNICAL FIELD

The present disclosure relates to the technical field of elevator manufacturing, in particular to an assembled passenger conveying system, a method of assembling an assembled passenger conveying system and a modularized device for assembling an assembled passenger conveying system.

BACKGROUND

With the continuous development of society, passenger conveying systems such as moving walkways, escalators and so on have been widely used in many places, which bring great convenience to people's work, production and travel. For the existing passenger conveying systems, the present application finds that there are still some aspects to be further improved and optimized.

For example, when using the existing technical means to build passenger conveying systems, due to the limitations of machine equipment, construction conditions and other aspects, it is often difficult to adapt to the installation site conditions to achieve satisfactory results. This is particularly obvious when the length of the site is limited (e.g., relatively long or short), which may bring problems such as poor installation effect, low construction efficiency and increased costs. For another example, the existing passenger conveying systems are generally designed in a linear arrangement, which makes it difficult to fully and flexibly adapt to the site conditions in some cases, thus making it difficult to use the passenger conveying system in an optimal manner.

The description in this section is intended to facilitate understanding of the present disclosure application, and therefore, unless otherwise stated, it should not be considered that any of the content described above belongs to the prior art simply because it is contained in this section.

SUMMARY

In view of the foregoing, the present disclosure provides an assembled passenger conveying system, a method of assembling an assembled passenger conveying system and A modularized device for assembling an assembled passenger conveying system, so as to solve or at least alleviate one or more of the aforementioned problems and other problems in the prior art.

According to one aspect of the present disclosure, an assembled passenger conveying system is first provided, which comprises: at least two modularized devices, wherein the at least two modularized devices are detachably connected to form a loading area, and power is supplied from one or more modularized devices to drive the loading area to travel on a conveying path of the assembled passenger conveying system.

In an assembled passenger conveying system according to the present disclosure, optionally, the modularized device comprise a motion portion that is movably arranged on a guide rail of the assembled passenger conveying system and provides a first loading area, and wherein the first loading area is configured to travel with respect to the guide rail when the motion portion is driven by power to move, and is arranged to be adjacent to a second loading area on at least another modularized device adjacent to the modularized device and forms at least a part of the loading area.

In an assembled passenger conveying system according to the present disclosure, optionally, the modularized device and the at least another modularized device are each provided with or share a power portion configured to provide power to drive the motion portion to move.

In an assembled passenger conveying system according to the present disclosure, optionally, the motion portion comprises a pedal and a base, the pedal is arranged on the base and the first loading area is located on the pedal, and the power portion is arranged on the base and beneath the pedal; and/or, the power portion comprises at least one motor.

In an assembled passenger conveying system according to the present disclosure, optionally, the motion portion comprises rollers connected to an output end of the power portion and driven by the power portion to travel on the guide rail, and rollers of respective motion portions of the at least two modularized devices are arranged on the guide rail after being detachably connected.

In an assembled passenger conveying system according to the present disclosure, optionally, the power portion is configured to receive electrical energy via a conductive member arranged in the assembled passenger conveying system, the conductive member including the guide rail; and/or, the power portion comprises at least one first motor and at least one second motor arranged in a first area and a second area of the base respectively, the first area and the second area being located on a same side of the base and opposite to each other.

In an assembled passenger conveying system according to the present disclosure, optionally, the modularized device and the at least another modularized device are each provided with or share a controller configured to control operation of the power portion.

In an assembled passenger conveying system according to the present disclosure, optionally, the controller is configured to control at least two motors to operate synchronously when the power portion comprises at least two motors, and/or the controller is configured to control the power portion in the modularized device and a power portion in another one or more modularized devices detachably connected to the modularized device to operate synchronously.

In an assembled passenger conveying system according to the present disclosure, optionally, the modularized device further comprises a mating portion configured to match with a mating portion on at least another modularized device adjacent to the modularized device for limiting relative movement thereof in a direction perpendicular to the loading area, and/or the assembled passenger conveying system includes a moving walkway and an escalator.

In an assembled passenger conveying system according to the present disclosure, optionally, the mating portion comprises a convex part and a concave part configured to match with corresponding concave and convex parts located on the at least another modularized device respectively.

Secondly, according to another aspect of the present disclosure, a method of assembling an assembled passenger conveying system is also provided, which comprises the steps of:

providing at least two modularized devices, wherein the modularized device is configured to be detachably connected to at least another modularized device to form a loading area, and at least one of the modularized devices is configured with power to drive the loading area to travel; and connecting the at least two modularized devices detachably and arranging them at an installation site of a passenger conveying system to form an assembled passenger conveying system, and driving the loading area to travel on a conveying path by supplying power from at least one of the modularized devices while operating.

In a method of assembling an assembled passenger conveying system according to the present disclosure, optionally, the modularized device comprise a motion portion that is movably arranged on a guide rail of the assembled passenger conveying system and provides a first loading area, and wherein the first loading area is configured to travel with respect to the guide rail when the motion portion is driven by power to move, and is arranged to be adjacent to a second loading area on at least another modularized device adjacent to the modularized device and forms at least a part of the loading area.

In a method of assembling an assembled passenger conveying system according to the present disclosure, optionally, the modularized device and the at least another modularized device are each configured with or share a power portion, through which power is supplied to drive the motion portion to move.

In a method of assembling an assembled passenger conveying system according to the present disclosure, optionally, the motion portion comprises a pedal and a base, the pedal is arranged on the base and the first loading area is located on the pedal, and the power portion is arranged on the base and beneath the pedal; and/or, the power portion comprises at least one motor.

In a method of assembling an assembled passenger conveying system according to the present disclosure, optionally, the motion portion comprises rollers connected to an output end of the power portion and driven by the power portion to travel on the guide rail, and rollers of respective motion portions of the at least two modularized devices are arranged on the guide rail after being detachably connected.

In a method of assembling an assembled passenger conveying system according to the present disclosure, optionally, electrical energy is supplied to the power portion via a conductive member arranged in the passenger conveying system, the conductive member including the guide rails; and/or, the power portion is provided with at least one first motor and at least one second motor arranged in a first area and a second area of the base respectively, the first area and the second area being located on a same side of the base and opposite to each other.

In a method of assembling an assembled passenger conveying system according to the present disclosure, optionally, the modularized device and the at least another modularized device are each provided with or share a controller, and operation of the power portion is controlled by the controller.

In a method of assembling an assembled passenger conveying system according to the present disclosure, optionally, the controller is configured to control at least two motors to operate synchronously when the power portion comprises at least two motors, and/or the controller is configured to control the power portion in the modularized device and a power portion in another one or more modularized devices detachably connected to the modularized device to operate synchronously.

In a method of assembling an assembled passenger conveying system according to the present disclosure, optionally, the modularized device further comprises a mating portion configured to match with a mating portion on at least another modularized device adjacent to the modularized device for limiting relative movement thereof in a direction perpendicular to the loading area, and/or the assembled passenger conveying system includes a moving walkway and an escalator.

In a method of assembling an assembled passenger conveying system according to the present disclosure, optionally, the mating portion comprises a convex part and a concave part configured to match with corresponding concave and convex parts located on the at least another modularized device respectively.

In addition, according to yet another aspect of the present disclosure, A modularized device for assembling an assembled passenger conveying system is further provided. The modularized device is configured to be detachably connected to at least another modularized device to form a loading area, and at least one of the modularized devices is configured with power to drive the loading area formed to travel on a conveying path of the assembled passenger conveying system.

In a modularized device according to the present disclosure, optionally, the modularized device comprise a motion portion that is movably arranged on a guide rail of the assembled passenger conveying system and provides a first loading area, and wherein the first loading area is configured to travel with respect to the guide rail when the motion portion is driven by power to move, and is arranged to be adjacent to a second loading area on at least another modularized device adjacent to the modularized device and forms at least a part of the loading area.

In a modularized device according to the present disclosure, optionally, the modularized device and the at least another modularized device are each provided with or share a power portion configured to provide power to drive the motion portion to move.

In a modularized device according to the present disclosure, optionally, the motion portion comprises a pedal and a base, the pedal is arranged on the base and the first loading area is located on the pedal, and the power portion is arranged on the base and beneath the pedal; and/or, the power portion comprises at least one motor.

In a modularized device according to the present disclosure, optionally, the motion portion comprises rollers connected to an output end of the power portion and driven by the power portion to travel on the guide rail, and rollers of respective motion portions of the at least two modularized devices are arranged on the guide rail after being detachably connected.

In a modularized device according to the present disclosure, optionally, the power portion is configured to receive electrical energy via a conductive member arranged in the assembled passenger conveying system, the conductive member including the guide rail; and/or, the power portion comprises at least one first motor and at least one second motor arranged in a first area and a second area of the base respectively, the first area and the second area being located on a same side of the base and opposite to each other.

In a modularized device according to the present disclosure, optionally, the modularized device and the at least another modularized device are each provided with or share a controller configured to control operation of the power portion.

In a modularized device according to the present disclosure, optionally, the controller is configured to control at least two motors to operate synchronously when the power portion comprises at least two motors, and/or the controller is configured to control the power portion in the modularized device and a power portion in another one or more modularized devices detachably connected to the modularized device to operate synchronously.

In a modularized device according to the present disclosure, optionally, the modularized device further comprises a mating portion configured to match with a mating portion on at least another modularized device adjacent to the modularized device for limiting relative movement thereof in a direction perpendicular to the loading area, and/or the assembled passenger conveying system includes a moving walkway and an escalator.

In a modularized device according to the present disclosure, optionally, the mating portion includes a convex part and a concave part configured to match with corresponding concave and convex parts located on the at least another modularized device respectively.

By applying the solutions of the present disclosure, the limitations or constraints of existing passenger conveying devices in such aspects as length and size, overall configuration, installation efficiency, construction cost and so on, can be effectively solved. It allows flexible design and assembly of corresponding modularized devices according to field conditions, thereby facilitating the assembly of satisfactory passenger conveying systems in a convenient, free and efficient manner, while saving costs, improving product competitiveness and the applicability of passenger conveying devices.

BRIEF DESCRIPTION OF THE DRAWINGS

The technical solutions of the present disclosure will be described in further detail below with reference to the accompanying drawings and embodiments. However, it should be understood that these drawings are designed merely for the purpose of explanation and only intended to conceptually illustrate the structures and configurations described herein, and are not required to be drawn to scale.

DETAILED DESCRIPTION

Firstly, it should be noted that the following will illustrate, by way of example, the structural composition, steps, characteristics, advantages, and the like of the assembled passenger conveying system, the modularized device for assembling a passenger conveying system and the method of assembling an assembled passenger conveying system according to the present disclosure. However, neither of the descriptions should be understood as limiting the present disclosure in any way. In the text, the technical terms "first", "second" are only used for the purpose of distinguishing and are not intended to indicate the order and relative importance thereof. The technical terms "connection" include connection in a direct or indirect manner. The technical term "passenger" should be understood in a broad sense as the objects, such as people, goods, pets, etc., carried by a passenger conveying system.

In addition, for any single technical feature described or implied in the embodiments mentioned herein, or any single technical feature shown or implied in individual drawings, the present disclosure still allows for any combination or deletion of these technical features (or equivalents thereof) without any technical obstacle. Therefore, it should be considered that further embodiments according to the present disclosure are also within the scope recorded in this document. To simplify the drawings, the same or similar components and features may only be denoted at one or several places in the same drawing. In addition, general matters known to those skilled in the art, such as the content relating to conventional components such as motors, trusses, guide rails, transmission mechanisms in conveying systems like escalators, moving walkways, etc., are not to be repeated herein.

Figure 1:
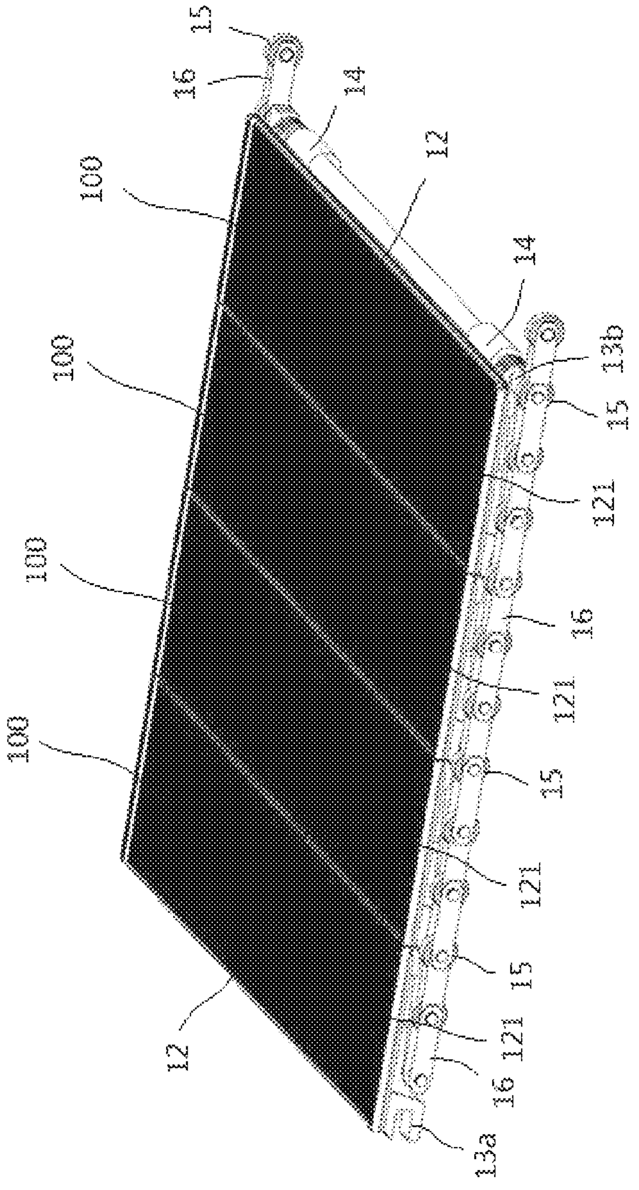
FIG. 1 is a three-dimensional structural schematic diagram which illustrates a plurality of the modularized devices according to a first embodiment of the present disclosure are used to assemble an example of a moving walkway.
Figure 2:
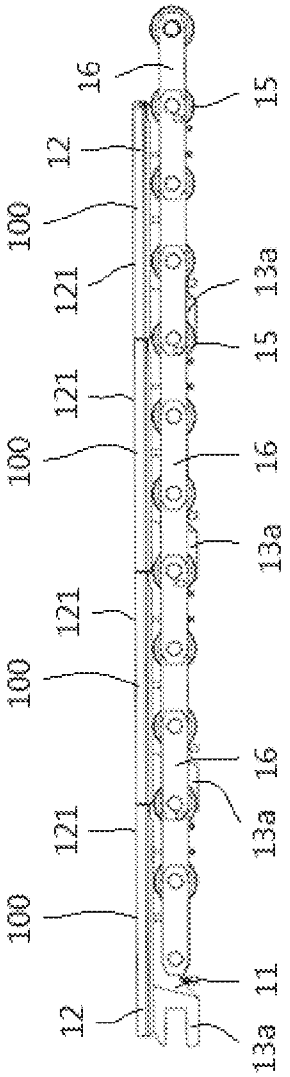
FIG. 2 is a side-view structural schematic diagram of the example of a moving walkway shown in FIG. 1.
Figure 3:
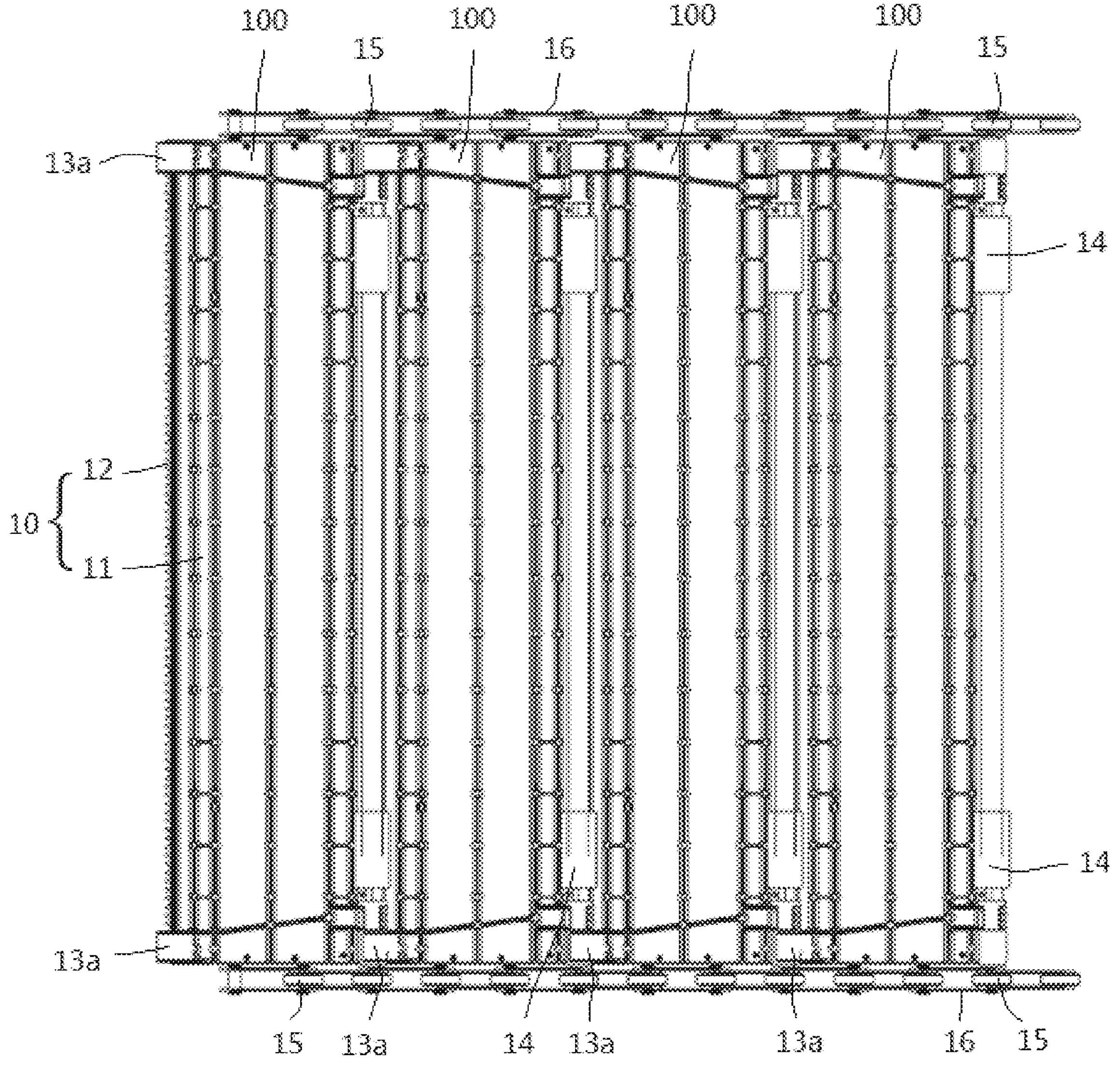
FIG. 3 is an upward structural schematic diagram of the example of a moving walkway shown in FIG. 1.
Figure 4:
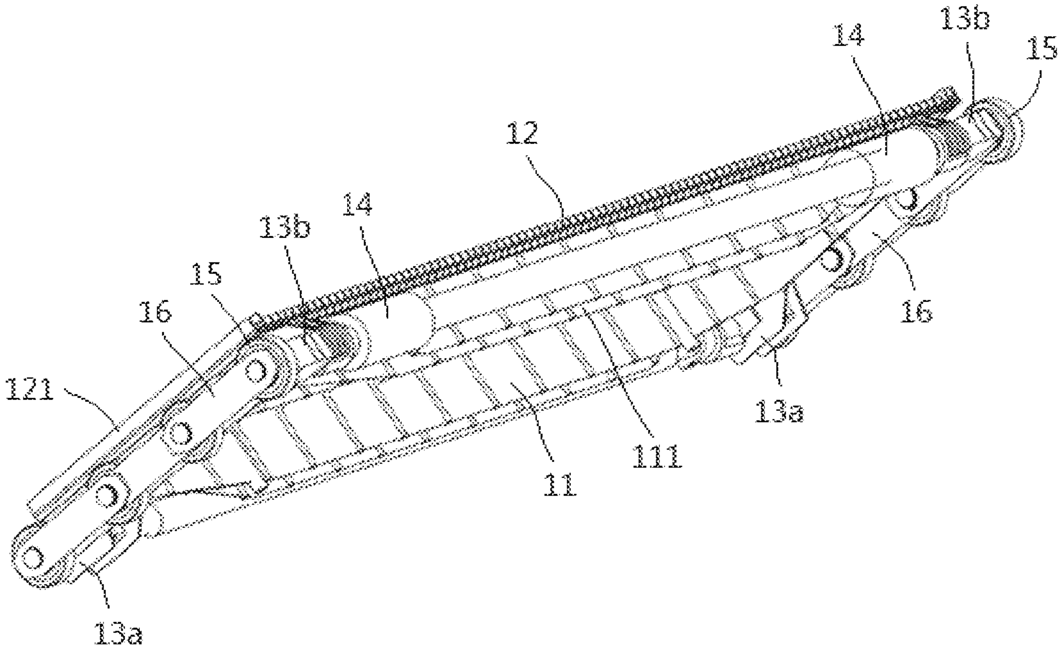
FIG. 4 is a three-dimensional structural schematic diagram of the modularized device according to the first embodiment used in FIG. 1.
Figure 5:
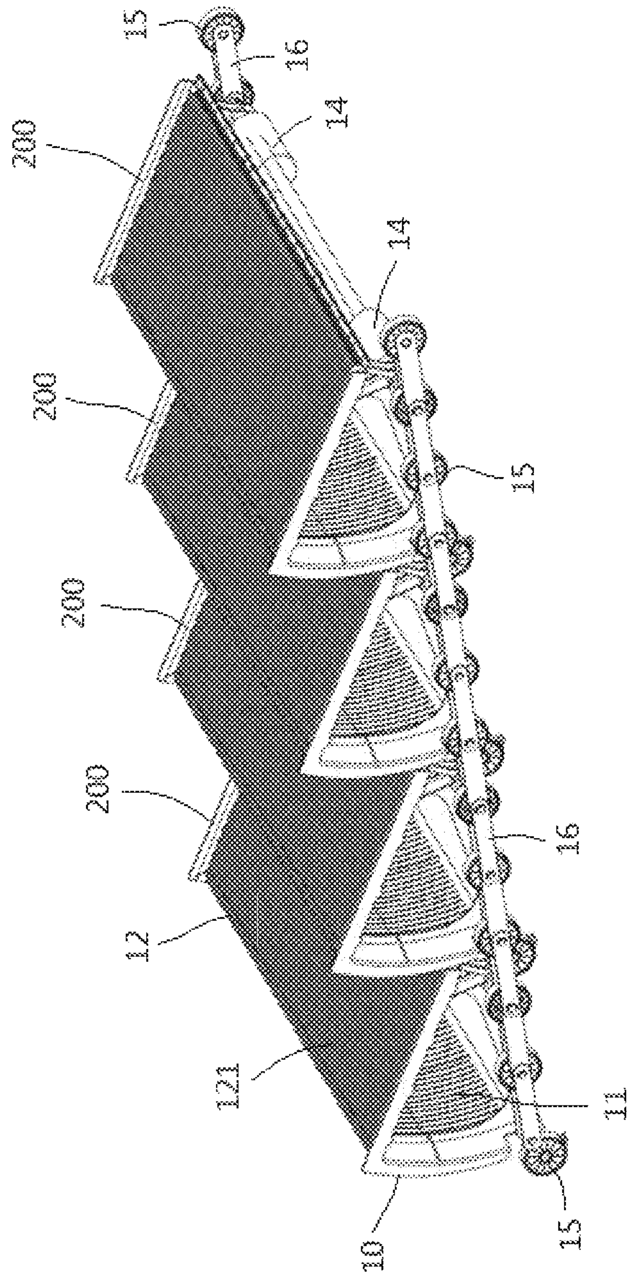
FIG. 5 is a three-dimensional structural schematic diagram which illustrates a plurality of the modularized devices according to a second embodiment of the present disclosure are used to assemble an example of an escalator.
Figure 6:
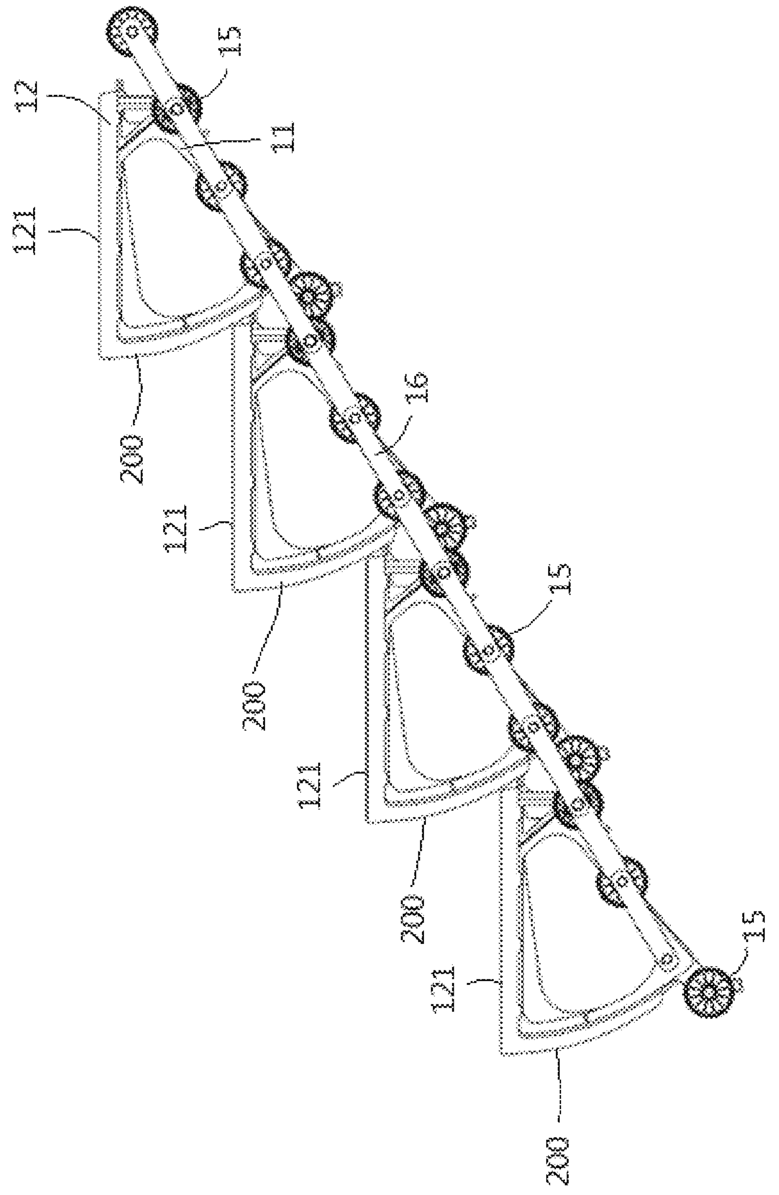
FIG. 6 is a side-view structural schematic diagram of the example of an escalator shown in FIG. 5.
Figure 7:
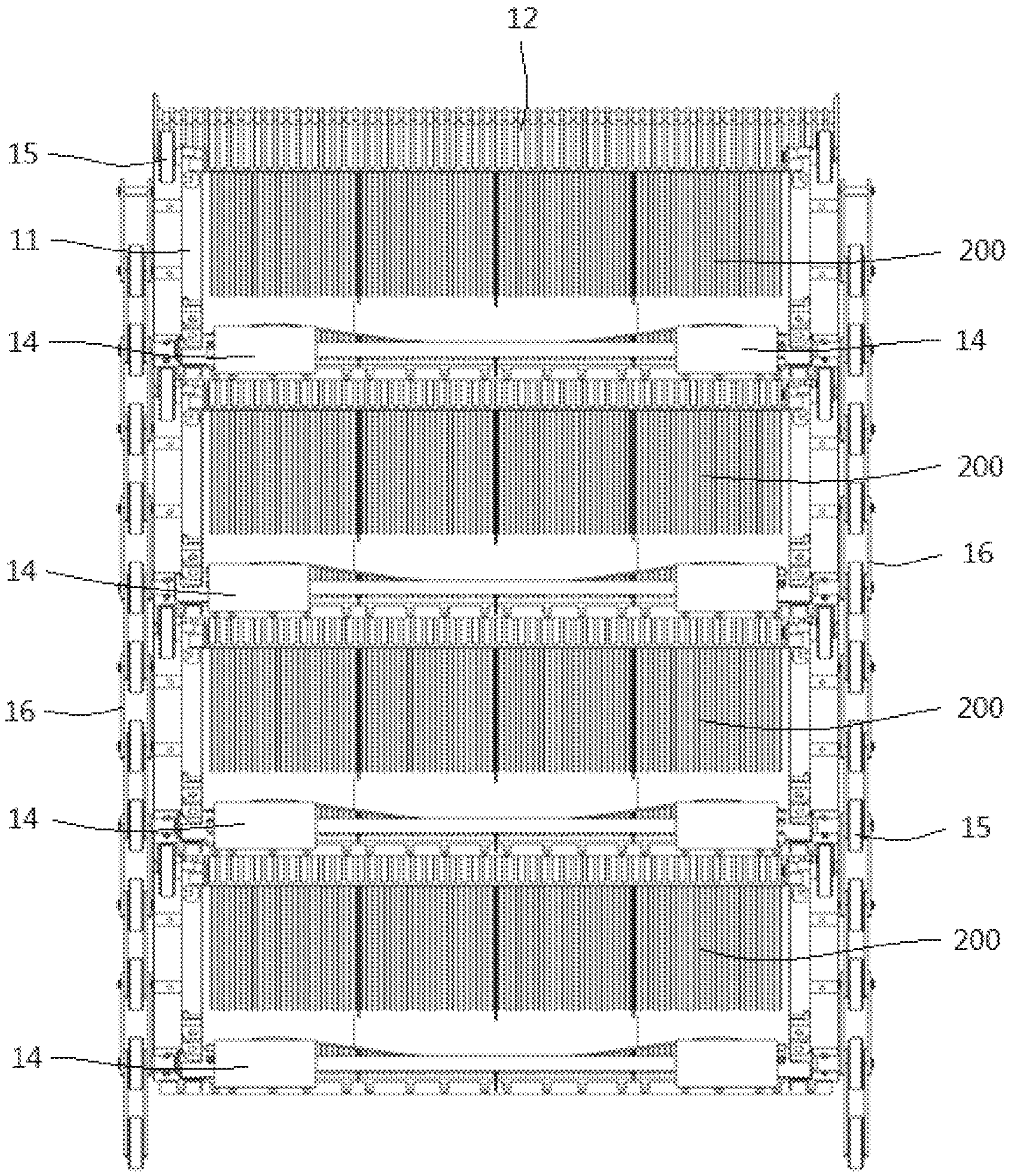
FIG. 7 is an upward structural schematic diagram of the example of an escalator shown in FIG. 5.
Figure 8:
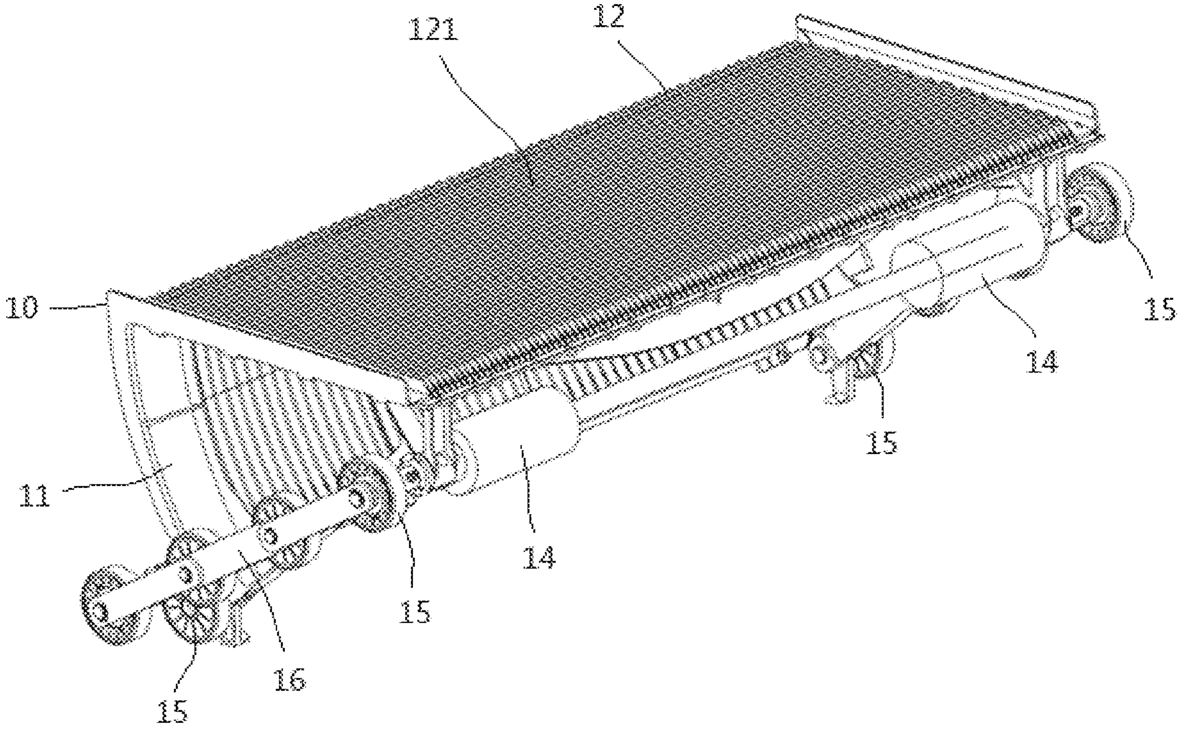
FIG. 8 is a three-dimensional structural schematic diagram of the modularized device according to the second embodiment used in FIG. 5.

FIGS. 1 to 3 schematically illustrate the general situation of using four modularized devices according to a first embodiment of the present disclosure to assemble an example of a moving walkway. FIG. 4 further provides the basic configuration of the modularized device according to the first embodiment. By assembling two or more of these modularized devices together as required, passenger conveying systems such as moving walkways can be constructed in a convenient, efficient and flexible manner.

Specifically, in the embodiments shown in the above drawings, e.g., as shown in FIG. 4, a modularized device 100 may include a base 11, a pedal 12, a power portion 14, and mating portions 13*a* and 13*b*. The base 11 is the basic structure of the modularized device through which components such as the pedal 12, the power portion 14, the mating portions 13*a* and 13*b* and passengers can be carried. For example, the pedal 12 can be mounted on the base 11 to provide a loading area for use by the passengers, and the power portion 14 can be mounted on the base 11 and beneath the pedal 12.

The base 11 can be fabricated from one or more rigid materials such as steel, cast iron, aluminum alloy, and can be fabricated by any suitable process such as casting, stamping, machining, and the like. There are no restrictions on the specific shape, size, structure, etc. of the base 11 in the present disclosure, which can be configured according to specific application requirements. For example, the base can be configured as rectangular, square, diamond, circular arc and other shapes. Or, as shown in FIG. 4, the base allows for the optional arrangement of suitable configurations such as a reinforcing structure 111. For another example, different bases with a series of dimensions can be manufactured at the same time to provide a series of modularized device products to meet different installation conditions, e.g., the length of the base is 1 m, 1.2 m, 1.5 m, 2 m, 3 m, etc., the width of the base is 0.2 m, 0.3 m, 0.5 m, 1 m, 1.5 m, etc., and the height of the base is 0.1 m, 0.2 m, 0.3 m, 0.5 m, etc., and so on.

In the modularized device 100, the base 11 and the pedal 12 can be used to form a motion portion 10, i.e., the motion portion 10 will be driven to move along the guide rail of the passenger conveying system upon receipt of power, thus enabling a loading area 121 on the modularized device 100 to travel along the direction of the guide rail. For example, when one or more passengers are in the loading area 121 in any possible posture such as standing, squatting or sitting, as the motion portion 10 is moving on the guide rail, this or these passengers carried by the loading area 121 will be driven to travel along with the loading area 121, which is usually towards the passenger conveying direction configured by the passenger conveying system. However, in the case of, for example, equipment testing, adjustment of conveying direction, etc., it is also possible to travel in other directions, such as in the opposite direction to the original passenger conveying direction.

The motion portion 10 can be driven to move by any one or more components or devices that are feasible, e.g., chains, conveyors, rollers, etc., which can be used to force the motion portion 10 to move on the guide rail of the passenger conveying system after being driven, for example, by means of a push or pull. For example, in one or some embodiments, the motion portions 10 of the respective modularized devices used to assemble a passenger conveying system can be connected together by means of connecting pieces such as chains, so that they can travel along the guide rail path together, thereby driving the passengers within the loading area 121 to travel accordingly. For example, the embodiments in FIGS. 1 to 4 show that rollers 15 in the modularized devices 100 can be connected together in a detachable manner using chains 16, where these rollers can form a part of the motion portion 10. It should be noted that, in some applications, the above rollers and chains may only be provided as external components to match with the modularized devices. That is, they are not configured as part of a modularized device. The above guide rail can be separately mounted on site to be adjacent to these modularized devices used to assemble the passenger conveying system, so that their respective motion portions 10 can travel along the guide rail to drive passengers within the loading area 121 to travel accordingly.

The loading area, which is usually realized by the pedal 12 in the motion portion 10, is arranged on the motion portion 10 for carrying passengers. The loading area is schematically shown in FIG. 1 and other appended drawings, denoted by reference numeral 121. By assembling the required number of modularized devices, the respective loading areas of these modularized devices can be adjacent to each other to form a larger area. It should be appreciated that the specific arrangement position, area size, etc. of the loading area 121 can be flexibly configured according to the application requirements, e.g., the entire area of the pedals facing upwards or part of it can be used as the loading area 121. Generally speaking, it is advantageous to provide a loading area 121 with a relatively large area, which allows a relatively larger number of passengers to be carried, thus improving the conveying capacity of the passenger conveying system. In practical applications, the loading area 121 can be constructed in any suitable shape, e.g., to be configured with pedal structures with clearance characteristics or anti-slip characteristics.

Unlike the conventional power supply means of existing passenger conveying systems, the present disclosure allows the modularized device 100 to be separately provided with a power portion 14 to provide power to drive the motion portion 10 to move, so that the loading area 121 can carry the passengers to move accordingly. The power portion 14 can generally be realized by one or more motors. For example, the output shafts of the motors are connected to the components such as rollers 15, and such components move along the guide rail path to drive the loading area 121 to travel.

As an example, the power portion 14 may be configured with one or more first motors and one or more second motors, while the specific configuration number, installation position, power, and the like of the above motors may be configured or adjusted as required. For example, the first motor and the second motor may be arranged in two different areas on the base 11, where these areas are located on the same side of the base 11 and opposite to each other, such that the motion portion 10 can be powered relatively evenly from different locations so that it can be driven for better movement. For example, in the embodiments shown in FIG. 1 and other drawings, a motor is arranged respectively on both sides of the base 11 of each modularized device 100, where the motors are connected to rollers 15 located on the respective side thereof to form a layout of providing power drive on both sides simultaneously.

In one or some embodiments, one or more of the motors in the power portion 14 may be used as redundant backups. For example, in the event of motors currently in operation going abnormal or faulty, the above motors that are used as redundant backups can be timely initiated to replace them, which is quite beneficial in ensuring the safety and reliability of the passenger conveying system, avoiding equipment damage or personal injury, and so on.

Electrical energy can be supplied to the motor(s) used as the power portion 14 in a number of ways. For example, the motor(s) can be powered by providing a battery, or powered by a conductive member arranged in the passenger conveying system, where such conductive member may include, but are not limited to, a guide rail along which the motion portion 10 can move in the passenger conveying system, or conductive cables leading to a power supply network for continuously supplying power. In some cases, it may also be considered to arrange or cover components made of electrical insulating materials (e.g., rubber sleeves, plastic sleeves, insulating tapes, etc.) on the conductive parts of the aforementioned guide rails for better safety protection.

The power portion 14 is illustrated by only taking the motor as an example. However, it should be noted that in some cases other types of devices such as hydraulic power devices, pneumatic power devices, fuel power devices, etc. may also be used to realize the power portion 14.

In addition, it should be noted that, in some applications, it is not necessary to configure a power portion 14 separately for one modularized device 100, but rather to allow two, three or more modularized devices 100 to share a power portion 14, where the power portion 14 may be arranged on any one or several of these modularized devices 100 as required, e.g., on the base 11 of one or two of the modularized devices 100.

In one or some embodiments, a controller may be separately configured for each modularized device 100, such that the controller can be used to control the operation of the power portion 14, such as initiating a redundant backup motor to replace the current motor when required as described above. Additionally, in one or some embodiments, two, three or more modularized devices 100 may share a common controller at the same time.

With the aforementioned controllers, it is also possible to control two or more motors that may be configured in one power portion 14 to operate synchronously, or control the power portions 14 in two or more different modularized devices 100 to operate synchronously as required. At the time of implementation, by means of, for example, arranging encoders, sensors (e.g., speed sensors, displacement sensors) and/or feature identification codes (e.g., QR codes, etc.) in the system, such as arranging them on site at preset intervals (e.g., 1 m, 2 m, 3 m, etc.) for sampling to obtain movement speed data of the motion portion at preset time intervals, so as to obtain the operation data of the motor and/or the motion portion desired to be controlled (e.g., motor speed, movement speed of the motion portion, etc.). These obtained operation data are then transmitted to the controller for analysis and processing to determine whether the respective power portions 14 (or the motors therein) are operating synchronously. Once asynchronous operation is detected, the controller can output control commands to adjust the operation of one or some of the power portions 14 (or one or some of the motors therein) that have problems until they come into synchronous operation again.

The above controllers can be realized by any suitable components such as chips, single-chip microcomputer, units or modules, and can be arranged at any suitable positions in the system as required, such as mounted on base 11 and power portion 14 of the modularized device 100, or on a control center of the passenger conveying system.

Optionally, mating portions may be provided on a modularized device 100, e.g. on the base 11, where such mating portions are configured to match with the corresponding mating portions on another modularized device 100 adjacent to this modularized device 100, so as to limit the relative movement of the two adjacent modularized devices 100 in a direction perpendicular to the loading area 121 while operating. This will help the system to have a more stable overall structure, thus operating in a more smooth and reliable manner.

It should be appreciated that, in accordance with the above disclosure of the present disclosure, those skilled in the art may design a number of feasible ways to realize the above mating portions. As an example only, for example, in conjunction with the examples shown in FIGS. 1 to 4, mating portions 13*a* and 13*b* can be provided on a modularized device 100, and optionally, they can be constructed with a concave structure and a convex structure that can match with each other respectively. For example, a mating portion 13*a* having a concave structure can be arranged at one end of the base 11, and a mating portion 13*b* having a convex structure is arranged at the other end of the base 11 (e.g. arranged on the output shaft of the motor at this end and adjacent to the rollers), thus allowing the mating portion 13*a* and 13*b* to match respectively with the corresponding mating portions 13*b* and 13*a* on another adjacent modularized device 100 for assembled connection with this modularized device 100. Optionally, two adjacent modularized devices 100 may be assembled such that their respective mating portions allows a relative displacement margin (the specific value of which can be configured as required) while operating, which facilitates moving walkways, etc. to have adjustability while moving along the guide rail, thus enhancing the stability of the overall operation of the system.

As an exemplary illustration, the example of FIG. 1 above only shows that four modularized devices 100 are used to assemble into a section of a moving walkway. In specific applications, however, two, three, four or more modularized devices of the present disclosure can be freely and flexibly selected and configured as required to assemble such passenger conveying systems. Such passenger conveying systems can be applied in different occasions and can be installed indoors or outdoors.

In specific applications, two or more modularized devices of the present disclosure can be assembled to form an assembled passenger conveying device with a linear conveying path, where such linear configuration is the conventional layout form for most passenger conveying devices. As previously described, the base, pedals, etc. of the modularized device of the present disclosure may have different sizes and configuration settings as required, so an assembled passenger conveying device having a curved conveying path can be assembled as required in some applications, such as allowing the passenger conveying path to be laid out horizontally in a S shape, C shape, O shape or other complex shapes.

Since the modularized device of the present disclosure allows flexible assembly and control drive by groups, in particular allows for a series of size specification configurations, it not only breaks the constraints on distance and so on of the installation sites, but also has obvious cost advantages in terms of installation personnel requirements, engineering construction, equipment transportation, and the like. In particular, different or identical modularized devices of corresponding quantities, specifications and structures can be selected and configured in a convenient, efficient and flexible manner according to the application environment, so that a more appropriate passenger conveying device that meets the environmental requirements can be constructed through appropriate selection and assembly. For example, two assembled passenger conveying devices can be assembled in parallel at the same time on site to provide passengers with opposite passenger conveying directions, which can have the same or totally different lengths depending on site conditions. In particular, either or both of them are allowed to be quickly disassembled at any time as required to achieve length adjustment or layout changes.

It should be appreciated that the passenger conveying system assembled using the modularized devices of the present disclosure is not limited to the moving walkway illustrated above. Such modularized devices can also be used to assemble other types of passenger conveying systems such as escalators, an example of which will also be given in the present disclosure.

With reference to FIGS. 5 to 8, in this escalator example, modularized devices 200 are used to assemble the passenger conveying system, where it is shown that four modularized devices 200 are assembled together to form different cascades in the escalator, and that the length, width and/or height of the base 11 and pedal 12 in the modularized device 200 can be constructed to be suitable for use as a cascade of an escalator. It should be appreciated that, unless otherwise stated herein, for the parts of the modularized device 200 same as or similar to the aforementioned modularized device 100, reference can be made to the relevant description of the modularized device 100 above. For example, power portion (s) (e.g., one or more) may be separately configured for each modularized device 200 in the escalator, or two or more modularized devices 200 may share common power portion (s) (e.g., one or more), so as to directly power the system from the modularized devices used to assemble the passenger conveying system.

Figure 9:
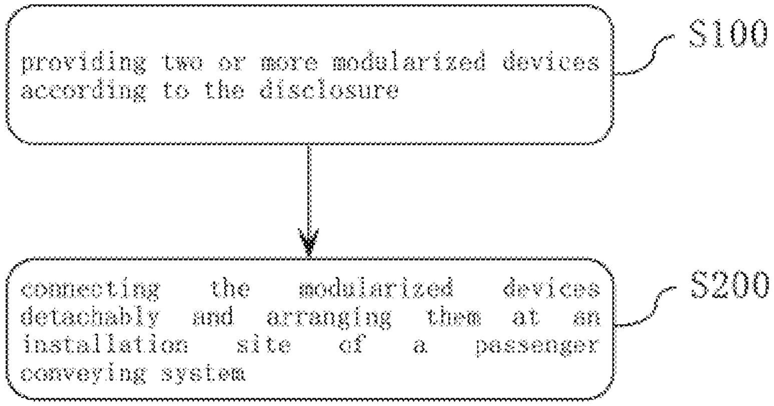
FIG. 9 is a process flow diagram illustrating an embodiment of a method for assembling an assembled passenger conveying system according to the present disclosure.

With continued reference to FIG. 9, a process flow diagram illustrating an embodiment of a method for assembling an assembled passenger conveying system according to the present disclosure is exemplarily shown. In this embodiment, the following steps may be included:

In step S100, two, three or more modularized devices of the present disclosure can be provided according to application requirements. These modularized devices can be detachably connected to form a loading area, where a single modularized device can, for example, be provided with components such as a base, pedal, etc. as previously described, and may include optional mating portions, power portions and controllers. However, at least one of these modularized devices is configured with power to drive the loading area to travel, which has been described in detail above.

In step S200, these modularized devices thus provided can be detachably assembled together and arranged at the installation site of the passenger conveying system, e.g., by installing the guide rail of the passenger conveying system on the site ground or on the truss, and then placing the respective motion parts (e.g., the rollers therein) of the assembled modularized devices on the guide rail, thereby forming an assembled passenger conveying system. When the system is operating, power supplied from the modularized devices can be used to drive the loading area to travel along the conveying path.

It will be appreciated by those skilled in the art that the modularized device and the respective components therein, such as the base, motion portion, power portion, controller, etc., have been described in great detail in the foregoing. For example, it is described that one or more motors used as the power portion may be arranged at an appropriate location on a modularized device as required, or that a plurality of modularized devices may share a power portion. For another example, it is described that the modularized devices in the assembled passenger conveying system are separately provided with corresponding controllers, or they share a common controller with which to control the operation of the power portion. Accordingly, reference can be made to the corresponding parts mentioned above, and further possible embodiments of a method for assembling an assembled passenger conveying system according to the present disclosure can thus be formed, which will not be repeated hereinafter.

An assembled passenger conveying system, a method of assembling an assembled passenger conveying system and A modularized device for assembling an assembled passenger conveying system according to the present disclosure have been described above in detail by way of examples only. These examples are merely used to illustrate the principles and embodiments of the present disclosure, rather than limiting the present disclosure. Various modifications and improvements can be made by those skilled in the art without departing from the scope of the present disclosure. Therefore, all equivalent technical solutions should fall within the scope of the present disclosure and be defined by the claims of the present disclosure.

What is claimed is:

1. An assembled passenger conveying system, comprising a modularized device, wherein the modularized device is detachably connected to a second modularized device to form a loading area, and power is supplied from the modularized device to drive the loading area to travel on a conveying path of the assembled passenger conveying system;

wherein the modularized device comprises a power portion comprising at least two motors; and wherein the modularized device comprises a controller configured to operate the power portion wherein the modularized device comprise a motion portion that is movably arranged on a guide rail of the assembled passenger conveying system and provides a first loading area, and wherein the first loading area is configured to travel with respect to the guide rail when the motion portion is driven by power to move, and is arranged to be adjacent to a second loading area on the second modularized device adjacent to the modularized device and forms at least a part of the loading area;

wherein the motion portion comprises a pedal and a base, the pedal is arranged on the base and the first loading area is located on the pedal, and the power portion is arranged on the base and beneath the pedal;

wherein the motion portion comprises rollers directly connected to output shafts of the at least two motors of the power portion and driven by the power portion to travel on the guide rail, and rollers of respective motion portions of the modularized device and the second modularized device are arranged on the guide rail after being detachably connected.

2. The assembled passenger conveying system according to claim 1, wherein the power portion is configured to receive electrical energy via a conductive member arranged in the assembled passenger conveying system, the conductive member including the guide rail.

3. The assembled passenger conveying system according to claim 1, wherein the second modularized device includes a second controller configured to control operation of the power portion.

4. The assembled passenger conveying system according to claim 3, wherein the controller is configured to control the power portion in the modularized device and a power portion in the second modularized device to operate synchronously.

5. The assembled passenger conveying system according to claim 1, wherein the modularized device further comprises a mating portion configured to match with a mating portion on the second modularized device adjacent to the modularized device for limiting relative movement thereof in a direction perpendicular to the loading area, and/or the assembled passenger conveying system includes a moving walkway and an escalator.

6. The assembled passenger conveying system according to claim 5, wherein the mating portion comprises a convex part and a concave part configured to match with corresponding concave and convex parts located on the second modularized device respectively.

7. A method of assembling an assembled passenger conveying system, comprising:

providing a modularized device and a second modularized device, wherein the modularized device is configured to be detachably connected to the second modularized device to form a loading area, and at least one of the modularized device and the second modularized device is configured with power to drive the loading area to travel; and connecting the modularized device and the second modularized device detachably and arranging the modularized device and the second modularized device at an installation site of a passenger conveying system to form an assembled passenger conveying system, and driving the loading area to travel on a conveying path by supplying power from at least one of the modularized device and the second modularized device while operating;

wherein the modularized device comprises a power portion comprising at least two motors; and wherein the modularized device comprises a controller configured to operate the power portion;

wherein the modularized device comprise a motion portion that is movably arranged on a guide rail of the assembled passenger conveying system and provides a first loading area, and wherein the first loading area is configured to travel with respect to the guide rail when the motion portion is driven by power to move, and is arranged to be adjacent to a second loading area on the second modularized device adjacent to the modularized device and forms at least a part of the loading area;

wherein the motion portion comprises a pedal and a base, the pedal is arranged on the base and the first loading area is located on the pedal, and the power portion is arranged on the base and beneath the pedal;

wherein the motion portion comprises rollers directly connected to output shafts of the at least two motors of the power portion and driven by the power portion to travel on the guide rail, and rollers of respective motion portions of the modularized device and the second modularized device are arranged on the guide rail after being detachably connected.

8. The method of assembling an assembled passenger conveying system according to claim 7, wherein electrical energy is supplied to the power portion via a conductive member arranged in the passenger conveying system, the conductive member including the guide rails.

9. The method of assembling an assembled passenger conveying system according to claim 7, wherein the second modularized device includes a second controller, and operation of the power portion is controlled by the second controller.

10. The method of assembling an assembled passenger conveying system according to claim 9, wherein the controller is configured to control the power portion in the modularized device and a power portion in the second modularized device to operate synchronously.

11. The method of assembling an assembled passenger conveying system according to claim 7, wherein the modularized device further comprises a mating portion configured to match with a mating portion on the second modularized device adjacent to the modularized device for limiting relative movement thereof in a direction perpendicular to the loading area, and/or the assembled passenger conveying system includes a moving walkway and an escalator.

12. The method of assembling an assembled passenger conveying system according to claim 11, wherein the mating portion comprises a convex part and a concave part configured to match with corresponding concave and convex parts located on the second modularized device respectively.

13. A modularized device for assembling an assembled passenger conveying system, wherein the modularized device is configured to be detachably connected to a second modularized device to form a loading area, and at least one of the modularized device and the second modularized device is configured with power to drive the loading area formed to travel on a conveying path of the assembled passenger conveying system;

wherein the modularized device comprises a power portion comprising at least two motors; and wherein the modularized device comprises a controller configured to operate the power portion;

wherein the modularized device comprise a motion portion that is movably arranged on a guide rail of the assembled passenger conveying system and provides a first loading area, and wherein the first loading area is configured to travel with respect to the guide rail when the motion portion is driven by power to move, and is arranged to be adjacent to a second loading area on the second modularized device adjacent to the modularized device and forms at least a part of the loading area;

wherein the motion portion comprises a pedal and a base, the pedal is arranged on the base and the first loading area is located on the pedal, and the power portion is arranged on the base and beneath the pedal;

wherein the motion portion comprises rollers directly connected to output shafts of the at least two motors of the power portion and driven by the power portion to travel on the guide rail, and rollers of respective motion portions of the modularized device and the second modularized device are arranged on the guide rail after being detachably connected.

14. The modularized device according to claim 13, wherein the power portion is configured to receive electrical energy via a conductive member arranged in the assembled passenger conveying system, the conductive member including the guide rail.

15. The modularized device according to claim 13, wherein the second modularized device includes a second controller configured to control operation of the power portion.

16. The modularized device according to claim 15, the controller is configured to control the power portion in the modularized device and a power portion in the second modularized device to operate synchronously.

17. The modularized device according to claim 13, wherein the modularized device further comprises a mating portion configured to match with a mating portion on the second modularized device adjacent to the modularized device for limiting relative movement thereof in a direction perpendicular to the loading area, and/or the assembled passenger conveying system includes a moving walkway and an escalator.

18. The modularized device according to claim 17, wherein the mating portion includes a convex part and a concave part configured to match with corresponding concave and convex parts located on the second modularized device respectively.

* * * * *